UNITED STATES PATENT OFFICE.

WALTER E. HASSAM, OF WORCESTER, MASSACHUSETTS, ASSIGNOR OF ONE-HALF TO CHARLES K. PEVEY, OF WORCESTER, MASSACHUSETTS.

PAVEMENT AND PROCESS OF LAYING THE SAME.

No. 819,652. Specification of Letters Patent. Patented May 1, 1906.

Application filed June 7, 1905. Serial No. 264,188.

*To all whom it may concern:*

Be it known that I, WALTER E. HASSAM, a citizen of the United States, residing at Worcester, in the county of Worcester and State of Massachusetts, have invented certain new and useful Improvements in Pavements and Processes of Laying the Same; and I do hereby declare the following to be a full, clear, and exact description of the invention, such as will enable others skilled in the art to which it appertains to make and use the same.

My invention relates to the making of stone or gravel roads or pavements, and it consists of an improvement in the method of making such roads or pavements, as hereinafter described, and particularly pointed out in the claims.

The object of my invention is to construct a cheaper, more durable, and for many purposes a more efficient road than has hitherto been constructed of broken stone or mixed stone and bituminous or other cement.

I have found that roads made of bituminous compounds after a certain period disintegrate and are expensive to repair. Roads constructed of concrete or stone and cement mixed before they are laid also crumble and break up in time because the presence of the partly-hardened cement between the stone when the mixture is laid prevents the stone from being brought close together by compression, but causes comparatively large cement-filled voids to be left between said stone, and said cement soon disintegrates because it was necessarily disturbed in setting by the mixing operation. It is a well-known fact that if cement is left undisturbed until it has entirely set it will be very strong and durable; but if it is mixed or otherwise disturbed during the time it is setting it will not last. It is therefore essential that the cement used in the construction of roads and pavements be handled and mixed as little as possible and that it be used or laid as soon as possible after it has been mixed. Owing to the employment of unskilled and careless workmen for laying concrete pavement the mixture of stone and cement is often handled more than is necessary, and it is often not laid for a considerable time after it has been mixed. The result is that the majority of this kind of road or pavement laid is even less durable than it would be if constructed under the best circumstances.

No bituminous material is used in my method of construction of road, but only broken stone or gravel, sand, and cement. The street is first dug out to the proper depth for the subgrade, which is rolled, if needed. Broken stone or gravel is then spread to a proper depth and rolled with a steam-roller or compressed by any suitable means until the voids between the stone are small and the surface even. It will be noted that as there is no coating of cement, bituminous, or other material on the pieces of stone they can be compressed very close together and solid, and the voids left between them will be extremely small. When the stone or gravel has been compressed to the desired closeness and firmness, it is grouted with a mixture of cement, sand, and water, which may not be prepared until immediately before it is to be used and which does not require excessive handling, like the mixture for concrete, and therefore does not suffer from being handled by careless workmen. All the voids are filled with the cement in the grouting operation. The cement is then allowed to stand until perfectly hard, and a solid foundation is obtained for brick, stone or wood block, or any other form of paving which will sustain a heavier load than if mixed concrete is used. Grouting is not only a great improvement over the old method of mixing concrete by hand, but it reduces the cost of construction. Instead of brick, stone-block, or any of the other surfaces stated above I preferably pour a thicker grout of cement, sand, and water over the foundation to the required depth, spread fine-broken stone or gravel upon it, and roll or compress said broken stone or gravel into the grout while it is green or before it is set, making a smooth but gritty surface. It has been found by experience that this method produces a water-tight, durable, up-to-date road, with the voids filled from top to bottom, and that it is easy to repair. It will be understood that this pavement may be used for roads, sidewalks, and anywhere else where it may be found useful.

Having thus described my invention, what I claim as new, and desire to secure by Letters Patent, is—

1. A road or pavement consisting of a bottom layer of hard-rolled uncoated stone, a grouting of cement placed upon said stone and filling all the voids therein, and a suitable surface placed on said grout.

2. A road or pavement consisting of a bottom layer of hard-rolled uncoated stone, a grouting of cement placed upon said stone and filling all the voids therein, a second layer of grouting placed on the first layer and a top layer of smaller uncoated stone compressed into the surface of said second layer of grouting before it is set.

3. The process of constructing a road or pavement which consists in laying a layer of uncoated stone, compressing said stone until the voids are small, then grouting with a mixture of cement, sand and water until all the voids in the stone layer are filled, adding a thicker grout of cement, sand, and water, spreading fine stone upon said grout and compressing it into the surface of said grout before it is set.

In testimony whereof I affix my signature in presence of two witnesses.

WALTER E. HASSAM.

Witnesses:
CHAS. K. PEVEY,
A. E. HAMM.